Figure 2:
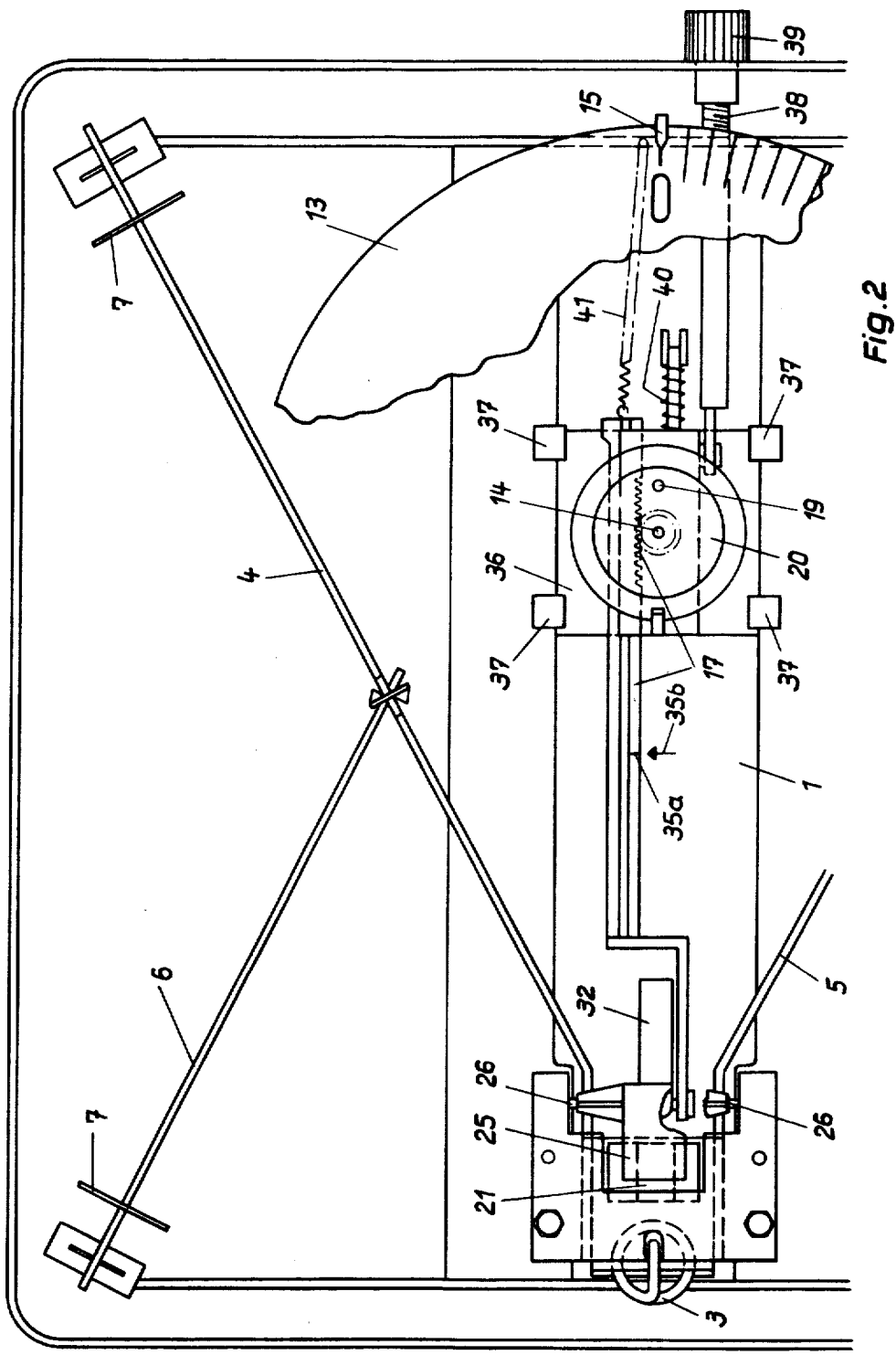

United States Patent [19]

Terraillon

[11] 4,084,650

[45] Apr. 18, 1978

[54] SPRING BALANCE

[75] Inventor: Paul Terraillon, Monnetier-Mornex, France

[73] Assignee: Terraillon, Annemasse, France

[21] Appl. No.: 694,682

[22] Filed: Jun. 10, 1976

[30] Foreign Application Priority Data

Sep. 10, 1975 Switzerland ............. 11733/75

[51] Int. Cl.² ........................................... G01G 23/14
[52] U.S. Cl. ..................................... 177/174; 177/260
[58] Field of Search ............... 177/174, 173, 230, 234, 177/256, 260; 73/1 B

[56] References Cited

U.S. PATENT DOCUMENTS

| | | | |
|---|---|---|---|
| 1,946,775 | 2/1934 | Zwickl | 177/230 |
| 1,982,939 | 12/1934 | Weber | 177/174 |
| 3,161,244 | 12/1964 | Hanssen | 177/173 |

FOREIGN PATENT DOCUMENTS 48,664   5/1975   Japan.

*Primary Examiner*—Joseph W. Hartary
*Attorney, Agent, or Firm*—Pennie & Edmonds

[57] ABSTRACT

A spring balance comprises an object-receiving plate cooperating with a weighing spring and with a movable rack meshing with the pinion of a rotatable graduated disc cooperating with a fixed index. Zero-setting and calibration of the balance are provided independently. Firstly, the rack is set to a zero position, then the disc is independently set to indicate zero. A reference weight is placed on the plate, and the balance calibrated to indicate the exact weight by varying the transmission ratio of a transmission lever between the weighing spring and the rack. This transmission lever has an arm of adjustable length which, when the rack is in the zero position, is perpendicular to the direction of movement of the rack.

8 Claims, 8 Drawing Figures

U.S. Patent  April 18, 1978  Sheet 1 of 3  4,084,650
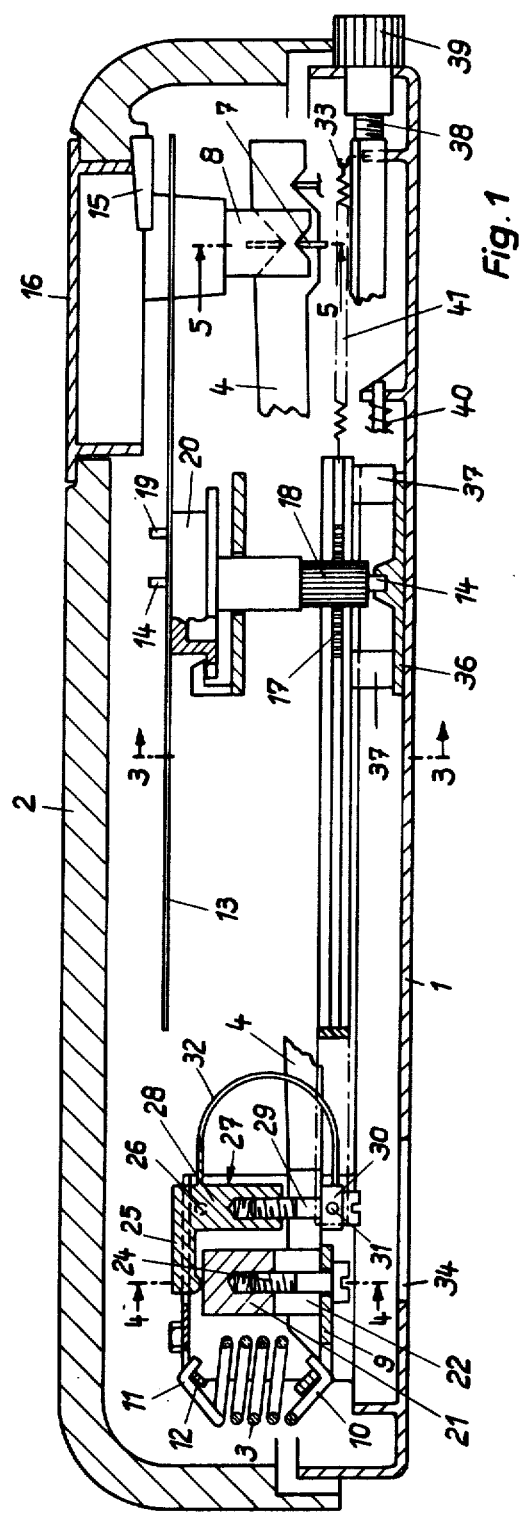
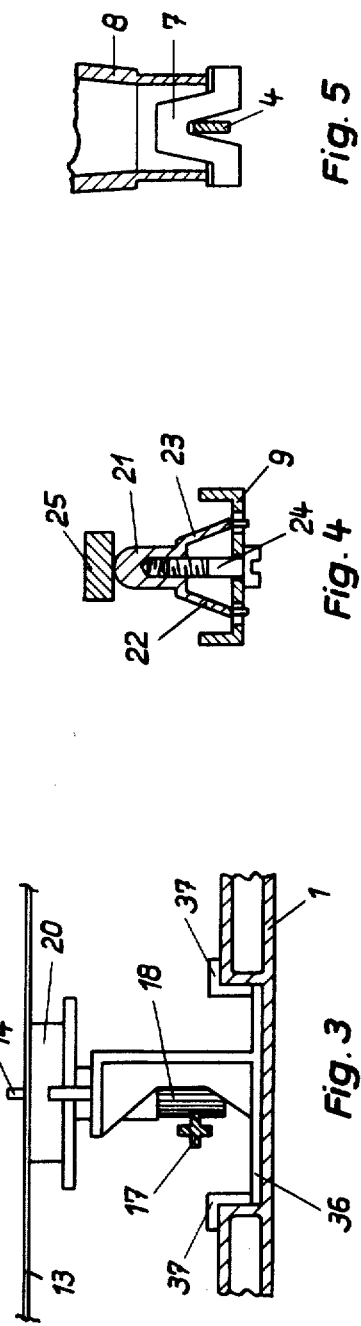
Fig. 1
Fig. 3
Fig. 4
Fig. 5

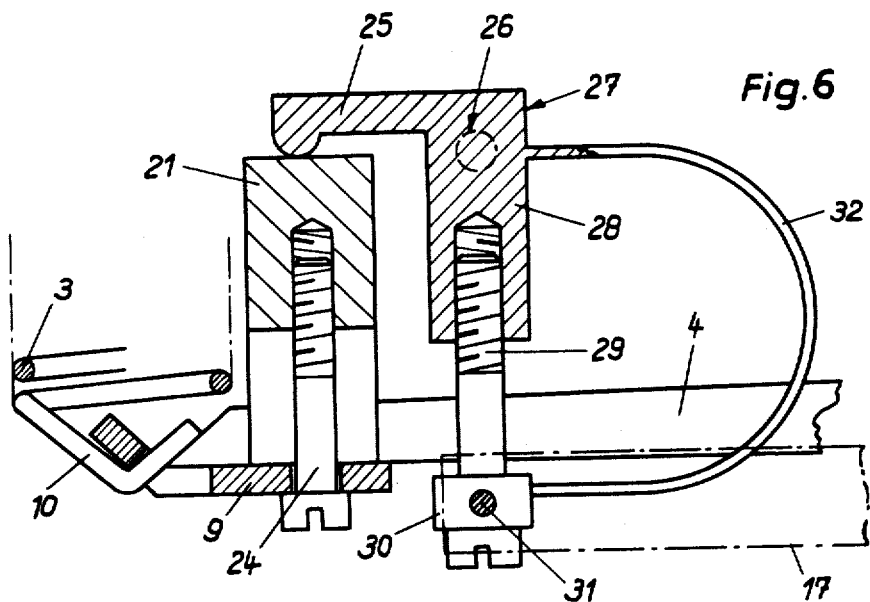
Fig. 6
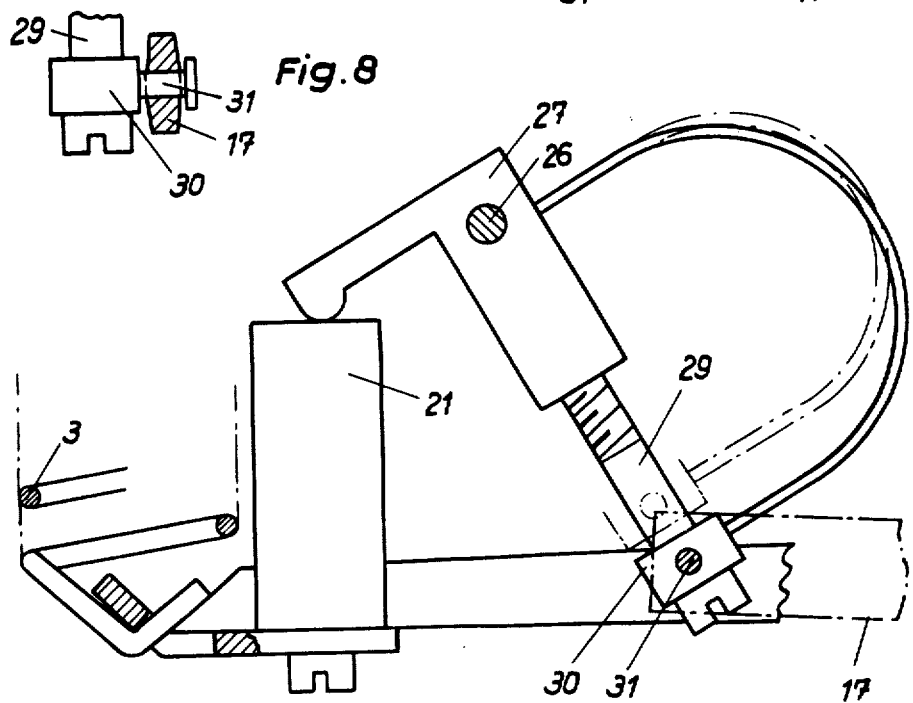
Fig. 8
Fig. 7

SPRING BALANCE

The invention concerns balances of the type comprising a movably-mounted plate for receiving objects to be weighed, cooperating with a weighing spring and with a movable rack meshing with a pinion rotating with a mobile part of a weight-indicating device.

Known balances of this type are inconvenient to regulate since the means provided for zero setting and the taring (calibration) means, i.e. ensuring the correct indication of a reference weight, are interdependent. When one of them is acted upon, regulation of the other is affected, so that one has to proceed by trial and error to finally obtain both a correct zero and a correct tare.

The balance according to the invention is conceived with a view to avoiding this defect, and is characterized in that it includes first means for setting the indication of the weight-indicating device to zero when the plate is not loaded, and second means for adjusting the displacement of the rack from the thus-fixed zero position when the plate is loaded with a reference weight to calibrate the balance by bringing the indication of said device to exactly show the reference weight, the first and second means being operative independently of one another.

The accompanying drawings show, by way of example, an embodiment of the invention. In the drawings:

FIG. 1 is a vertical cross-section through a balance;
FIG. 2 is a partial plan view corresponding to FIG. 1;
FIG. 3 is a cross-section along line 3—3 of FIG. 1;
FIG. 4 is a cross-section along line 4—4 of FIG. 1;
FIG. 5 is a cross-section along line 5—5 of FIG. 1;
FIGS. 6 and 7 are views of a part of FIG. 1 to a greater scale; and
FIG. 8 is a side view of a detail of FIGS. 6 and 7.

The balance shown includes a base or frame 1 and a plate 2 for receiving objects to be weighed. The plate 2 cooperates with a weighing spring 3 by the intermediary of a system of amplifying levers 4, 5, 6 as is known. The plate 2 rests on these levers by the intermediary of parts 8 (FIG. 1) which rest on yokes 7 (FIGS. 1 and 5).

The left-hand ends of the principal levers 4, 5 (looking at the drawings) are fixed to a piece 9 which is hooked on the mobile end 10 of the weighing spring 3. At its opposite end 11, spring 3 is hooked to a fixed part 12 secured to the frame 1. When the plate 2 is loaded, the part 9 moves down and the spring 3 elongates by a quantity proportional to the weight on plate 2. The amplitude of the weight is transmitted, by means that will be described, to a graduated disc 13 turning about a spindle 14, and whose graduations cooperate with a fixed reference mark or index 15 carried by the plate 2. The index 15 and the adjacent part of the graduations of disc 13 are visible through a transparent window 16 in plate 2.

Movements of the piece 9 are transmitted to a rack 17 meshing with a pinion 18 keyed on the spindle 14 and fixed angularly to the disc 13 by means of two holes in this disc receiving an end of the spindle 14 and a stud 19 carried by a piece 20 fixed to pinion 18.

The transmission of movement between the piece 9 and the rack 17 takes place as follows. An adjustable stop 21, visible on FIGS. 1 and 4, is held applied on the piece 9 by two slightly flexible arms 22, 23 and a setting screw 24. By acting on the screw 24 (FIG. 4), the distance between the upper end of the stop 21 and the piece 9 is varied. On the upper end of stop 21 bears an arm 25 of an elbow lever 27 pivoted about a pin 26 which is fixed relative to frame 1. The other arm of lever 27 is formed of two parts movable longitudinally relative to one another, namely a tapped part 28 receiving a screw 29 against the head of which bears a ring 30 carrying a pin 31 serving as pivot for the left-hand end of rack 17. A resilient spring-forming part 32 biases the ring 30 to always bear against the head of screw 29. By turning the screw 29, the effective length of the lever arm 28–29, i.e. the distance separating the pins 26 and 31, is modified.

A traction spring 41 (FIGS. 1 and 2), fixed between the right-hand end of rack 17 and a fixed point 33 of frame 1, biases the rack 17 towards the right and, consequently, constantly holds the end of lever arm 25 on the adjustable stop When the balance is not loaded, the spring 3 is fully relaxed (FIG. 6), as it is only subjected to the action of the weight of the plate 2 and the action of spring 41.

The balance is regulated by firstly setting the rack 17 to a zero-position when the plate 2 is not loaded. For this, the screw 24 is turned by means of a screwdriver that is passed through an opening 34 in the frame 1 to pivot the lever 27 and displace the rack 17 until a reference mark 35a it carries is located exactly facing a fixed reference mark 35b carried by the frame 1 (FIG. 2). The rack 17 is shown in this zero position in FIGS. 1 and 2. The parts are so dimensioned and arranged that, at rest, when the rack 17 is in this exact zero position, a straight line passing through the axes of pins 26 and 31 is practically perpendicular to the direction of movement of the rack 17, hence vertical in this example.

When the plate 2 is not loaded, and even though the rack 17 is in the correct zero position, the disc 13 may nevertheless not be in the correct angular position, so that it indicates a value slightly different to zero. To remedy this, the following additional regulating means are provided. The pinion 18 is carried by a carriage 36 slidably mounted on the frame 1 along a direction parallel to the rack 17. To this end, carriage 36 slides between the frame 1 and four fixed guides 37. Sliding of the carriage 36 is controlled by a setting screw 38 actuable by a control knob 39. A biasing spring 40 constantly urges the carriage 36 towards the left of FIGS. 1 and 2.

To regulate the correct zero angular position of the graduated disc 13 once the rack 17 is in the exact zero position, the knob 39 is turned to move the carriage 36 and hence turn the pinion 18 by rolling on the rack 17. Turning of the knob 39 is continued until the zero graduation of disc 13 coincides exactly with the index 15. The last-described regulation is itself completely independent of the preceding zero-setting regulation of the rack, since it has no effect on the position of rack 17.

Once the balance has been set to zero, one proceeds to tare (calibrate) and, for this, the plate 2 is loaded with a reference weight. If the indication of the balance does not correspond exactly to the reference weight, the screw 29 is turned by means of a screwdriver inserted in the opening 34 to vary the length of the lever arm 28–29, i.e. the separation of pins 26 and 31, which produces a change in the transmission ratio between the piece 9 and rack 17 (see FIG. 7). This regulation is continued until the index 15 faces the exact indication of the reference weight. It will be observed that this third regulation, calibration or taring, has no effect on the previous zero-setting of the rack 17 and zero-setting of the disc 13, since only the length of the lever arm 28–29 varies during taring but not its position, because by the first regulation the lever arm 28–29 was set perpendicular to the rack 17 and its direction of movement.

Hence, the three described regulating means are operative independently of one another, which eliminates the inconvenience of trial-and-error indicated at the outset concerning the known constructions.

Once these three regulations are terminated, the balance is ready for use.

FIG. 6 shows the weighing spring 3 fully relaxed, i.e. with the plate 2 unloaded, whereas FIG. 7 shows the spring 3 extended under the effect of a weight resting on the plate 2, as well as the corresponding positions of the elbow lever 27 and rack 17. On FIG. 7, the position of pin of pin 31 the furthest away from pin 26 is shown in full lines; and the position of pin 31 closest to pin 26 is shown in chain lines.

What is claimed is:

1. A weighing scale of the type disclosed comprising a support frame, a weighing platform movably mounted with respect to said support frame, and a weighing mechanism interconnected between said frame and said platform, said weighing mechanism including:
   a. an indicating means for indicating the weight of an object placed upon said platform,
   b. a pinion mounted for rotation on said frame,
   c. an elongated rack in mesh with said pinion,
   d. said indicating means being connected to said pinion for indicating the weight of an object upon actuation of said rack and rotation of said pinion,
   e. a weigh spring interconnected between said platform and said frame for spring movement in response to an object place upon said platform,
   f. a fulcrum,
   g. a lever interconnected between said weigh spring and said rack and pivoted on said fulcrum,
   h. one end of said lever also being pivoted to said rack,
   i. said lever being arranged substantially perpendicular to the direction of travel of the rack when said rack is in its zero position,
   j. means for adjusting the indicating means to zero when the rack is in its zero position and the platform is not loaded,
   k. the length of said lever between said fulcrum and the pivot point of said lever on said rack being adjustable in length for affecting calibration of the weighing mechanism under a known predetermined load, and
   l. adjustment of the length of said lever to calibrate the mechanism as aforesaid being without any substantial effect upon the zero adjustment of said indicating means.

2. The device of claim 1 in which adjustment of said indicating means moves said pinion with respect to said rack thus moving the indicating means without moving said rack.

3. The device of claim 2 in which said lever comprises two members movable one relative to the other along the line extending through said fulcrum and the pivot point at which said lever is pivoted to said rack for relative movement of said two members along the length of said line without affecting the zero position of said indicating means.

4. A balance comprising a movably-mounted plate for receiving objects to be weighed, cooperating with a weighing spring and with a movable rack meshing with a pinion rotating with a mobile part of a weight-indicating device, first means for setting the indication of said device to zero when the plate is not loaded, second means for adjusting the displacement of the rack from the thus-fixed zero position when the plate is loaded with a reference weight to calibrate the balance by bringing the indication of said device to exactly show the reference weight, the first and second means being operative independently of one another, the first means comprising an adjustable stop carried by a part movable with an operative end of the weighing spring, a lever pivoted about an axis fixed in relation to a frame of the balance, said lever having a first arm contacting the adjustable stop under the action of a spring to follow movements of said stop during weighing and a second arm on which the rack is pivoted whereby the rack is driven by said second arm during weighing, and a setting screw for setting the position of the adjustable stop to adjust the position of the axis of pivoting of the rack on the second lever arm to bring the rack to a correct zero position.

5. A balance according to claim 4, in which said second lever arm is arranged so that a straight line passage through the pivoting axis of said lever and the pivoting axis of the rack on the second lever arm is practically perpendicular to the direction of movement of the rack during weighing, when the rack is set in the correct zero position.

6. A balance according to claim 5, in which the first means further comprise a reference mark fixed in relation to the frame, to indicate when the rack is exactly in the zero position.

7. A balance according to claim 5, in which the second means are formed by said second lever arm which is of adjustable length and is formed of two parts movable relative to one another along said straight line to adjust the separation of said two axes.

8. A balance according to claim 5, in which the first means comprise means, operative independently of the means for zero-setting the rack, for setting the indication of said device to zero, comprising an adjustable carriage slidably mounted along a direction parallel to the rack, said carriage carrying the pinion which can turn by rolling on the rack in response to adjustment of the carriage.

* * * * *